US008234019B2

(12) United States Patent
Todeschi et al.

(10) Patent No.: US 8,234,019 B2
(45) Date of Patent: Jul. 31, 2012

(54) DEVICE AND METHOD FOR AUTOMATICALLY GENERATING A CONTROL ORDER FOR AN AIRCRAFT CONTROL SURFACE

(75) Inventors: Jean-Noël Todeschi, Pibrac (FR); Rémy Dayre, Pibrac (FR)

(73) Assignee: Airbus Operations (SAS), Toulouse (FR)

( * ) Notice: Subject to any disclaimer, the term of this patent is extended or adjusted under 35 U.S.C. 154(b) by 320 days.

(21) Appl. No.: 12/631,618

(22) Filed: Dec. 4, 2009

(65) Prior Publication Data

US 2010/0145554 A1    Jun. 10, 2010

(30) Foreign Application Priority Data

Dec. 8, 2008    (FR) ..................................... 08 06866

(51) Int. Cl.
*G01C 23/00*    (2006.01)
(52) U.S. Cl. .......................................... 701/3; 244/75.1
(58) Field of Classification Search ...... 701/3; 244/75.1
See application file for complete search history.

(56) References Cited

U.S. PATENT DOCUMENTS 7,366,592 B2 *    4/2008    Delaplace et al. ................ 701/4

FOREIGN PATENT DOCUMENTS

| FR | 2855922 | 12/2004 |
| FR | 2901893 | 12/2007 |
| FR | 2905353 | 3/2008 |
| FR | 2907234 | 4/2008 |
| FR | 2908219 | 5/2008 |
| WO | WO 02/06908 | 1/2002 |

* cited by examiner

*Primary Examiner* — Thomas Black
*Assistant Examiner* — Luke Huynh
(74) *Attorney, Agent, or Firm* — Novak Druce + Quigg LLP

(57) ABSTRACT

A device and a method for automatically generating a control order of an aircraft control surface. The device can include means for automatically calculating and transmitting, in the case of a suspected deficiency of a control surface control order, a limited auxiliary order, during a confirmation time of the deficiency.

11 Claims, 3 Drawing Sheets

DEVICE AND METHOD FOR AUTOMATICALLY GENERATING A CONTROL ORDER FOR AN AIRCRAFT CONTROL SURFACE

CROSS-REFERENCE TO RELATED APPLICATIONS

This application claims priority to French Patent Application 0806866, filed Dec. 8, 2008, the entire contents of which are incorporated herein by reference.

FIELD OF THE INVENTION

The present invention relates to a device and a method for automatically generating a control order for at least one aircraft control surface, in particular, a carrier airplane, as well as a system and a method for automatically controlling a control surface using respectively said device and said method.

BACKGROUND OF THE INVENTION

The present invention applies to an aircraft, including a civil carrier airplane, being provided with an electric flight control system. It is known from FR-2,908,219 a particular architecture of such an electric flight control system, with a particular arrangement between a flight managing system and a flight path computer allowing for the exchanges inside said flight control system to be rationalized and simplified.

It is known that a usual architecture for controlling an aircraft control surface, for example a rudder or an elevator, comprises a so-called master computer being intended to generate control orders and to send such control orders to one or more so-called slave computers, filling the function of slaving the control surface(s) following such control orders. Such a usual architecture makes it necessary to implant into the master computer monitoring means for checking whether the issued orders are correct so as to avoid slaving, in the slave computers, the control surfaces following erroneous orders.

Usual monitoring operations plan to compare control orders being computed by two different units and to state the master computer as being out of order, should a deviation occurs (between control orders), higher than the monitoring threshold, said deviation having to be confirmed with time.

However, during a deficiency, until the monitoring threshold is reached and such a deviation is confirmed, an erroneous order continues being applied by slave computers to the control surfaces, leading to bring the latter to erroneous positions, and thereby to abnormally increase aerodynamic stresses on the structure of the control surfaces and of the aircraft.

Moreover, adjusting such usual monitorings does not make it possible to detect low level deficiencies, as the monitoring threshold and time delay should be robust, in particular, with respect to static (use of different sensors) and dynamic (asynchronism, law transition) deviations between both units. Therefore, by way of an illustration, for a control surface such as an elevator of a large capacity airplane, the deficiency of the issued order may lead to erroneous steering angles higher than about ten degrees.

SUMMARY OF THE INVENTION

The aim of the present invention is to overcome such drawbacks. It relates to a device for automatically generating a control order for at least one aircraft control surface, allowing to detect and inhibit control order generation deficiencies with low levels, while ensuring the robustness and the availability of said device.

To this end, according to the invention, said device of the type comprising:
first means for generating at least one control order;
second means for issuing such a control order for user means;
third means for monitoring the control order generated by said first means, so as to check whether it has a correct value or a wrong value, a wrong value representing a suspected deficiency, and should such a suspected deficiency be detected, in order to check whether said control order has a wrong value during a predetermined confirmation time, so as to confirm the deficiency; and
fourth means for inhibiting the control order issue when a deficiency is confirmed,
is outstanding in that it further comprises:
fifth means for determining, as soon as a suspected deficiency is detected, an auxiliary control order, summing the latest generated control order before such a detection and a predetermined order value illustrating a tolerated error margin; and
sixth means for automatically transmitting to said second means, with a view to its issue as a control order:
said control order generated by said first means, in the absence of a deficiency and a suspected deficiency; and
said auxiliary control order determined by said fifth means, as soon as a suspected deficiency is detected, and this, until the end of said confirmation time, from which:
if the deficiency is confirmed, the issue of the control order is inhibited;
otherwise said control order generated by said first means is issued again.

Thus, thanks to this invention, should a deficiency be suspected, and before a possible definite confirmation of the deficiency, there is not issued a control order, for which a deficiency is suspected, to said user means (in particular slaving means), but an auxiliary control order is transmitted having an acceptable value. Such a value is acceptable, as it corresponds to the sum of the last value of the control order, being judged as correct, and a tolerated error margin. Consequently, such an auxiliary control order, being issued during the confirmation time, represents a limited value which does not involve any risk for the control surface or the aircraft structure, allowing for the above described drawbacks to be overcome.

In case of a suspected deficiency, it is necessary to check that the control order keeps a wrong value for some time (i.e. said confirmation time), so as to avoid considering simple transient errors as being deficiencies.

According to this invention, during the confirmation time, there is thus not issued the control order that it generated by said first means, as such an order might have a wrong value likely to cause an excessive steering angle and not corresponding to any desired control.

Moreover, at the end of the confirmation time, one of the two following situations occurs:
either the deficiency is confirmed, and any issue of a control order by the device according to the invention, is inhibited by said fourth means;
or the deficiency is invalidated, i.e. the monitored control order goes back to a correct value during the confirmation time, and such a control order (generated by the first means) could again be issued to said users means.

In a preferred embodiment:

said device comprises two computing units, each of which generates a control order, one of said computing units comprising said first means; and said third means intended to monitor the control order generated by the first means, are formed so as to simultaneously use the control orders generated by such two computing units.

In addition, advantageously, said third means comprise at least one monitoring unit being integrated into one of said computing units and comprising:

a computing element calculating the difference between the control orders generated by said two computing units;

a comparison element comparing the difference calculated by said computing element to a predetermined value representing said tolerated error margin, a suspected deficiency being detected as soon as said difference is higher than said predetermined value; and a confirmation element for checking, as soon as such a suspected deficiency is detected, whether said difference remains higher than said predetermined value during said confirmation time, in order to confirm the deficiency.

Such a monitoring unit allows to detect order errors related to errors of a unit calculating the control order, to issue deficiencies on a bus existing between the computing units, and to bus acquiring deficiencies.

In such a case, in a preferred embodiment, said device comprises two such monitoring units, one of which is integrated into one of said computing units and the other one being integrated into the other computing unit, allowing specifically to detect acquisition problems at the level of each of the units. Thus, the device according to the invention is able to detect specifically a bus acquisition deficiency in each of the computing units.

Furthermore, in a preferred embodiment, said fifth and sixth means are part of a computing assembly comprising:

a first element, for example, a voter for determining an intermediary order, among control orders generated by both calculation units;

a second element for adding said tolerated error margin to said intermediary order;

a third element for subtracting said tolerated error margin from said intermediary order; and a voter receiving the values being determined by said first, second and third elements, selecting the median value of the thus received values, and transmitting the selected median value to said second means so as to issue it as a control order.

In this preferred embodiment, advantageously, said first element is formed so as to determine as an intermediary value:

in the absence of detection of a suspected deficiency and in the absence of a deficiency, the most delayed control order of both control orders generated by said two calculation units; and should a suspected deficiency be detected, the last generated control order before such a detection.

Furthermore, the device according to the present invention also comprises at least one auxiliary monitoring unit being integrated into one of said computing units and comprising:

a computing element calculating the difference between the control orders generated respectively by said two computing units;

a comparison element comparing the difference calculated by said computing element to a predetermined auxiliary value; and a confirmation element for checking, as soon as said difference is higher than said predetermined auxiliary value, whether it remains so for an auxiliary confirmation time.

Such an auxiliary monitoring unit allows to detect issuing deficiencies on the system bus and computing errors of the control order issued by a computing unit.

The present invention also relates to a system for automatically controlling at least one aircraft control surface, as well as an aircraft, comprising such a device and/or such a system.

According to the invention, said automatic control system is outstanding in that it comprises:

at least one actuator for said control surface, being able to automatically move the latter;

one device such as the above-mentioned one, for automatically generating a control order, and for automatically issuing such a control order to slaving means; and said slaving means automatically applying such a control order to said actuator for the control surface.

The present invention also relates to a method for automatically generating a control order of at least one aircraft control surface, in particular of a carrier airplane.

According to the invention, said method wherein:

A/ at least one control order is generated; and

B/ such a control order is issued to users means, wherein, in addition, the following operations are performed:

said control order generated in step A/ is monitored, in order to check whether it has a correct value or a wrong value, a wrong value representing a suspected deficiency, and if such a suspected deficiency is detected, in order to check whether said control order has a wrong value during a predetermined confirmation time, in order to confirm the deficiency; and when a deficiency is confirmed, issuing said control order of step B/ is inhibited, is outstanding in that furthermore, the following operations are performed:

as soon as a suspected deficiency is detected, an auxiliary control order is determined, summing the last generated control order before such a detection and an order value illustrating a tolerated error margin; and in step B/, there is issued to the users means, as a control order:

said control order generated in step A/, in the absence of a deficiency and a suspected deficiency; and said auxiliary control order as soon as a suspected deficiency is detected, and this, until the end of said confirmation time, from which:

if the deficiency is confirmed, the issue of the control order is inhibited;

otherwise said control order generated in step A/ is issued again.

Furthermore, the present invention also relates to a method for automatically controlling at least one aircraft control surface, being outstanding in that:

a control order is automatically generated, implementing a method such as the above mentioned one;

such a control order is automatically issued to slaving means; and such a control order is automatically applied to at least one actuator of said control surface, by means of said slaving means.

BRIEF DESCRIPTION OF THE DRAWINGS

The figures of the appended drawing will make it possible to understand how this invention could be implemented. In the figures, identical reference numerals relate to similar components.

DETAILED DESCRIPTION

Figure 1:
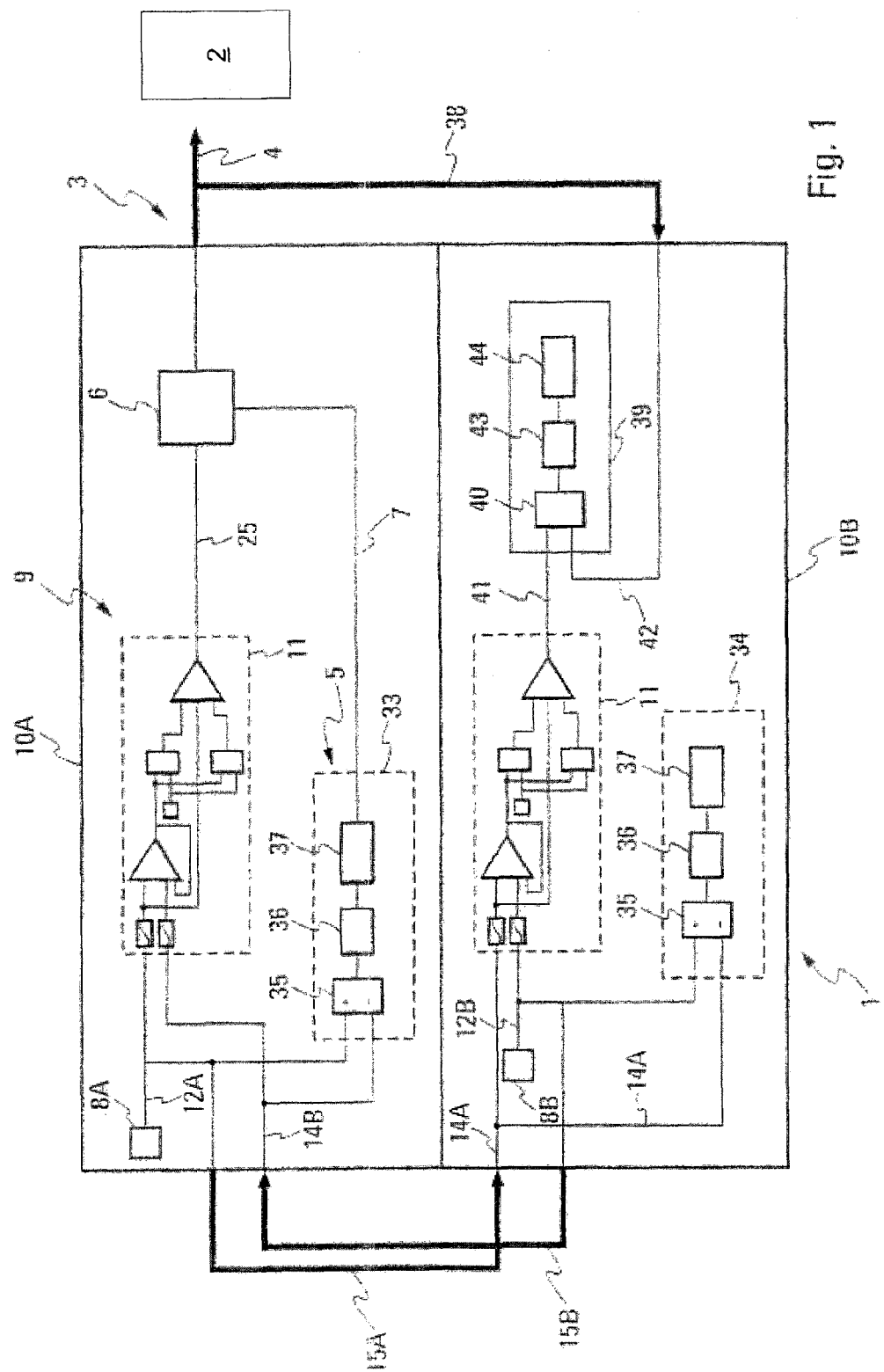
FIG. 1 is the schematic block diagram of a device for automatically generating a control order of an aircraft control surface.

The device 1 according to this invention and schematically shown on FIG. 1 is used for automatically generating a control order for at least an aircraft control surface 2, in particular of a carrier airplane. Said control surface 2 could be more specifically a side control surface, an elevator or a rudder for an aircraft.

To this end, the device 1 comprises:
  usual means 8A for generating at least one control order representing a deflection order for the control surface 2, being expressed, for example, as a steering angle (in °);
  usual means 3, comprising more specifically a bus 4, for issuing such a control order to users means (external to said device 1 and detailed below);
  means 5 for monitoring the control order generated by said means 8A:
  in order to check whether this control order has a correct value or a wrong value, a wrong value representing a suspected deficiency; and
  if such a suspected deficiency is detected, in order to check whether said control order has a wrong value for a predetermined confirmation time, for example 300 ms, in order to confirm the existence of a deficiency; and
  usual means 6 being connected by means of a link 7 to said means 5 and being formed so as to inhibit the issue of a control order implemented by said means 3, when a deficiency is confirmed by said means 5.

According to this invention, to be in a position to detect and inhibit deficiencies of control order generation, having reduced levels, while ensuring robustness and availability of said device 1, the latter further comprises, according to this invention:
  means 9 for determining, as soon as a suspected deficiency is detected, an auxiliary control order, summing the latest generated control before such a detection and a predetermined order value illustrating a tolerated error margin as detailed hereinafter; and
  means, preferably said means 9, for automatically transmitting to said means 3, with a view to its issue as a control order:
  said control order generated by said means 8A, in the absence of a deficiency and a suspected deficiency; and
  said auxiliary control order determined by said means 9, as soon as a suspected deficiency is detected, and this, until the end of the confirmation time.

At the end of said confirmation time:
  if the deficiency is confirmed, the issue of a control order is completely inhibited by said means 6; and
  if on the contrary, the deficiency is invalidated, said control order generated by said means 8A is again issued (as usual) by said means 3.

Thus, thanks to this invention, should a deficiency be suspected, and before a possible definite confirmation of the deficiency, the device 1 does not issue any control order, for which a deficiency is suspected, to said user means (in particular slaving means 50 as described hereinafter), but it transmits an auxiliary control order having an acceptable value.

Such a value is acceptable, as it corresponds to the sum of the last value of the control order, judged as correct, and a tolerated error margin, as explained hereinafter. Consequently, such an auxiliary control order, being issued during the confirmation time, represents a limited value which does not involve any risk for the structure of the control surface 2 and/or the aircraft.

Should a deficiency be suspected, it is necessary that the device 1 checks (using the means 5) whether the control order keeps a wrong value for some time (said confirmation time), so as to avoid considering simple transient errors as being deficiencies.

Thus, according to this invention, during said confirmation time, the device 1 does not issue the control order being generated by said means 8A, as such an order might present a wrong value likely to cause an excessive steering of the control surface 2, that does not correspond to any desired control.

Moreover, at the end of the confirmation time, two situations could occur:
  either the deficiency is confirmed, and any issue of a control order by the device 1 according to this invention (via the bus 4, more specifically), is inhibited by said means 6. The device 1 is then considered as being deficient regarding the control order generation;
  or the deficiency is invalidated, i.e. the monitored control order goes back to a correct value before the end of the confirmation time, and such a control order (generated by the means 8A) could again be issued to users means (via the bus 4, more specifically).

In a preferred embodiment, said device 1 comprises two computing units 10A and 10B, each of which comprises means 8A and 8B for usually generating a control order for the control surface. Such usual means 8A and 8B could use the same sensors or different sensors. Such means 8A and 8B could, for example, comprise at least one sensor automatically determining the actuation amplitude of a control joystick, being used for controlling the control surface 2 and able to be manually actuated by the pilot of the aircraft, the control order being representative of such amplitude. Such means 8A and 8B could also comprise means for automatically measuring or determining the common values of parameters of the aircraft and means for automatically computing a control order using such common values.

In such a preferred embodiment (shown on FIG. 1):
  the calculation until 10A comprises said means 8A generating the control order used for the issue (via the bus 4 more particularly), in the absence of a deficiency or a suspected deficiency; and
  said third means 5 intended to monitor the control order generated by said means 8A are formed so as to simultaneously use the control orders generated by such two computing units 10A and 10B (i.e. by said means 8A and 8B that transmit them by links 12A and 14B).

In a preferred embodiment, said means 9 comprise a computing assembly 11. Such computing assembly 11 comprises as shown on FIG. 2:
  an element 13 for determining an intermediary control order, including a steering order (expressed for example in °), from control orders generated respectively by the means 8A and 8B and received through links 12A and 14B, the link 14B being connected to a bus 15B being provided between the two computing units 10A and 10B and being linked more specifically to the outlet link 12B of means 8B;
  a computing element 16 summing the intermediary control order (received from said element 13 via a link 17) and a tolerated error margin (received from means 18, for example a memory, via a link 19);

an element 20 calculating the difference between the intermediary control order, received by the link 17, and the tolerated error margin, for example 5°, received by the link 19; and a voter 21 receiving at its (three) entries, respectively:

through a link 22, the control order generated by the means 8A;

through a link 23, the sum calculated by the computing element 16; and through a link 24, the difference calculated by the computing element 20.

Said voter 21 selects the median value of all three values received at its entries, and it transmits such a median value via a link 25 to said means 3, for the issue of such a median value as a control order, via said bus 4.

Figure 2:
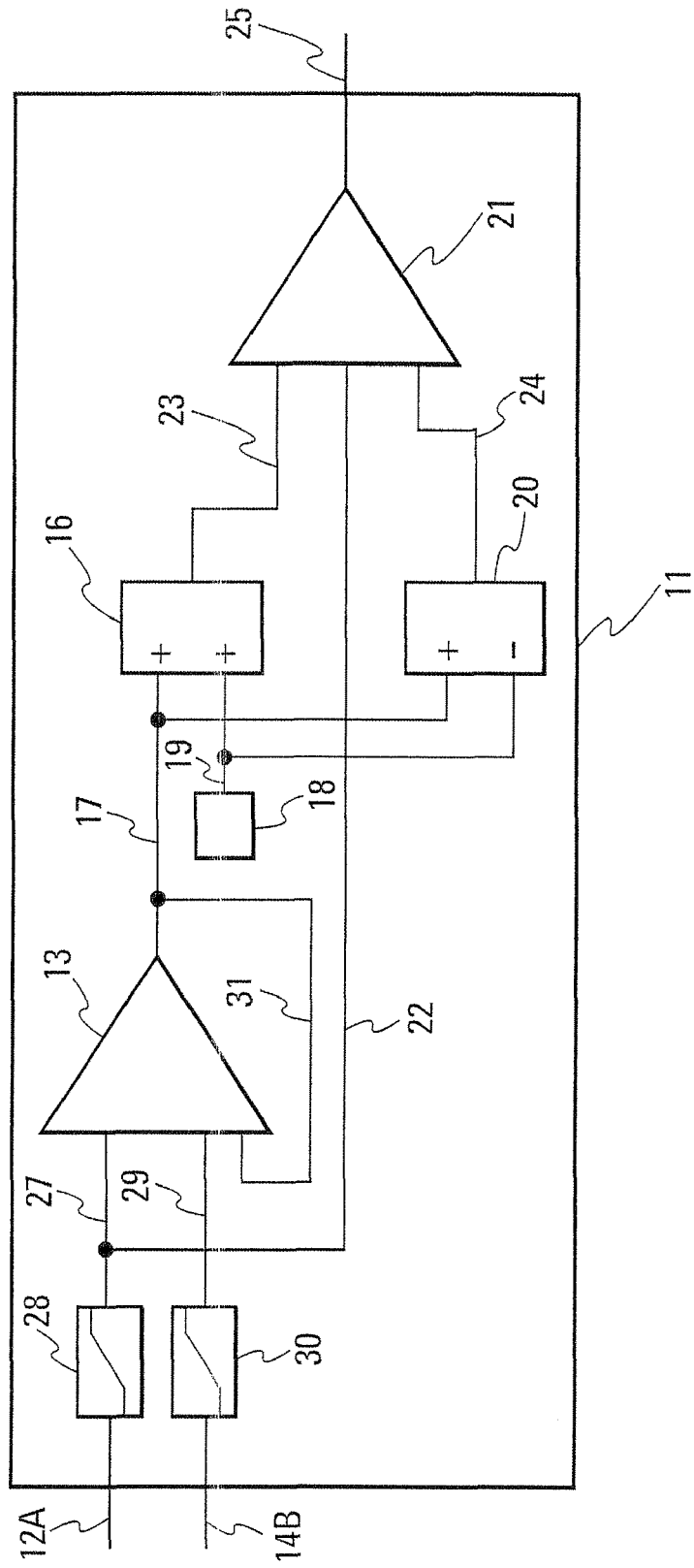
FIG. 2 schematically illustrates a computing assembly being part of a device according to this invention.

As shown on FIG. 2, said element 13 receives at its (three) entries, respectively:

through a link 27, the order generated by the means 8A and limited by a usual limiting (or clipping) means 28;

through a link 29, the order generated by the means 8B and limited by a usual limiting (or clipping) means 30 (similar to means 28) and;

through a re-looping link 31, the value generated at the outlet of said element 13.

Said element 13 is a voter being formed so as to issue at its outlet, as an intermediary value:

in the absence of detection of a suspected deficiency and in the absence of a deficiency (the latter information being able to be received from said means 5), the most delayed control order among both control orders generated by both computing units 10A and 10B; and in the case of the detection of a suspected deficiency, the last control order (of constant value) generated before such a detection, or even the non erroneous order among both orders (transiently, it could follow the erroneous order, but always in the tolerance range between both orders).

Moreover, according to this invention, the tolerated error margin, provided by the means 18, should take into account the need to limit the steering value under a tolerable threshold and should not, in the absence of a deficiency, affect the control order. By means of an illustration, in a large capacity carrier airplane, the control orders could be calculated every forty milliseconds, with an issue every forty milliseconds just after the calculation of the order, an acquisition in the other competing unit at ten milliseconds, and a calculation of the issued order at ten milliseconds. Also, the orders between the computing units 10A and 10B are, at the maximum, desynchronized by sixty milliseconds. As the variation of the orders is limited on the airplane to thirty degrees per second, the maximum deviation between the orders generated by both competing units 10A and 10B equals 1.8 degrees. Also, in order not to disrupt the evolution of the order generated by the means 8A when out of deficiency, a tolerated error margin is selected being higher than 1.8 degrees. If six degree steering angles are tolerated, one could, for example, select a value of five degrees as the tolerated error margin.

Furthermore, said means 5 comprise at least a monitoring unit 33 being integrated into the computing unit 10A and comprising:

a computing element 35 calculating the difference between the control orders, generated respectively by means 8A and 8B of said computing units 10A and 10B;

a comparison element 36 comparing the difference calculated by said computing element 35 to a predetermined value representing said tolerated error margin, for example, five degrees. In this case, a suspected deficiency is detected as soon as said difference becomes higher than said predetermined value; and a confirmation element 37 for checking, as soon as such a suspected deficiency is detected, whether said difference remains higher than said predetermined value during said confirmation time, for example, 300 ms, in order to confirm the deficiency.

Such a monitoring unit 33 allows to detect order errors relating to errors of the means 8A generating the control order, to issue deficiencies on an existing bus 15A, 15B between the computing units 10A and 10B, and to acquisition deficiencies in the bus.

The monitoring as implemented by such a monitoring unit 33 should be robust to usual deviations between both computing units 10A and 10B. Such current deviations are due to:

the asynchronism between both computing units 10A and 10B: sixty milliseconds at thirty degrees per second, i.e. 1.8°;

static deviations on the measurements, being very low if both computing units 10A and 10B use common sensors; and dynamic deviations mainly caused by law transitions.

In this case, in a preferred embodiment, said device 1 comprises two identical monitoring units 33 and 34, one of them 33 being integrated into the computing unit 10A and the other one 34 being integrated into the computing unit 10B, as shown on FIG. 1. Such a preferred embodiment allows, in particular, for acquisition deficiencies of the bus (inter-units) to be detected at the level of each of the computing units 10A and 10B.

The monitoring implemented by said device 1 also comprises at least one auxiliary monitoring unit 39 being integrated into one of said computing units 10A and 10B and comprising:

a computing element 40 calculating the difference between control orders respectively issued by both computing units 10A and 10B. To this end, such computing element 40 is connected:

on the one hand, via a link 41, to a computing assembly 11 being integrated into the computing unit 10B, being identical to the computing assembly 11 of the computing unit 10A and being connected by its entries to the means 8A (via links 12A, 15A and 14A) and to the means 8B (via a link 12B); and on the other hand, to the bus 4 via links 38 and 42, that is at the outlet of the computing unit 10A;

a comparison element 43 comparing the difference calculated by said computing element 40 to a predetermined auxiliary value, for example 3°; and a confirmation element 44 for checking, as soon as said difference is higher than said predetermined auxiliary value, whether it remains so for an auxiliary confirmation time, for example, 100 ms.

Such an auxiliary monitoring unit 39 allows to detect issue deficiencies on the bus 4 and calculation errors of the control order issued by a computing unit 10A, 10B (and calculated by the computing assemblies 11).

The monitoring as implemented by such an auxiliary monitoring unit 39 should be robust to normal deviations being related only to the asynchronism between both computing units 10A and 10B, since it rigorously compares the same passivated order. Such a monitoring should be sufficiently quick so as to meet the objective of deficiency detection. In order to guarantee this last point, the users calculators (of the issued control order) should limit the velocity of the variation of the order to be received.

It should be noted that the different monitorings implemented by the device 1 according to this invention could be formed so as to activate the inhibition means 6 should a deficiency be detected.

In a preferred embodiment, the device 1 for automatically generating a control order for a control surface, as mentioned hereinabove, is part of a system 46 for automatically controlling an aircraft control surface 2.

Figure 3:
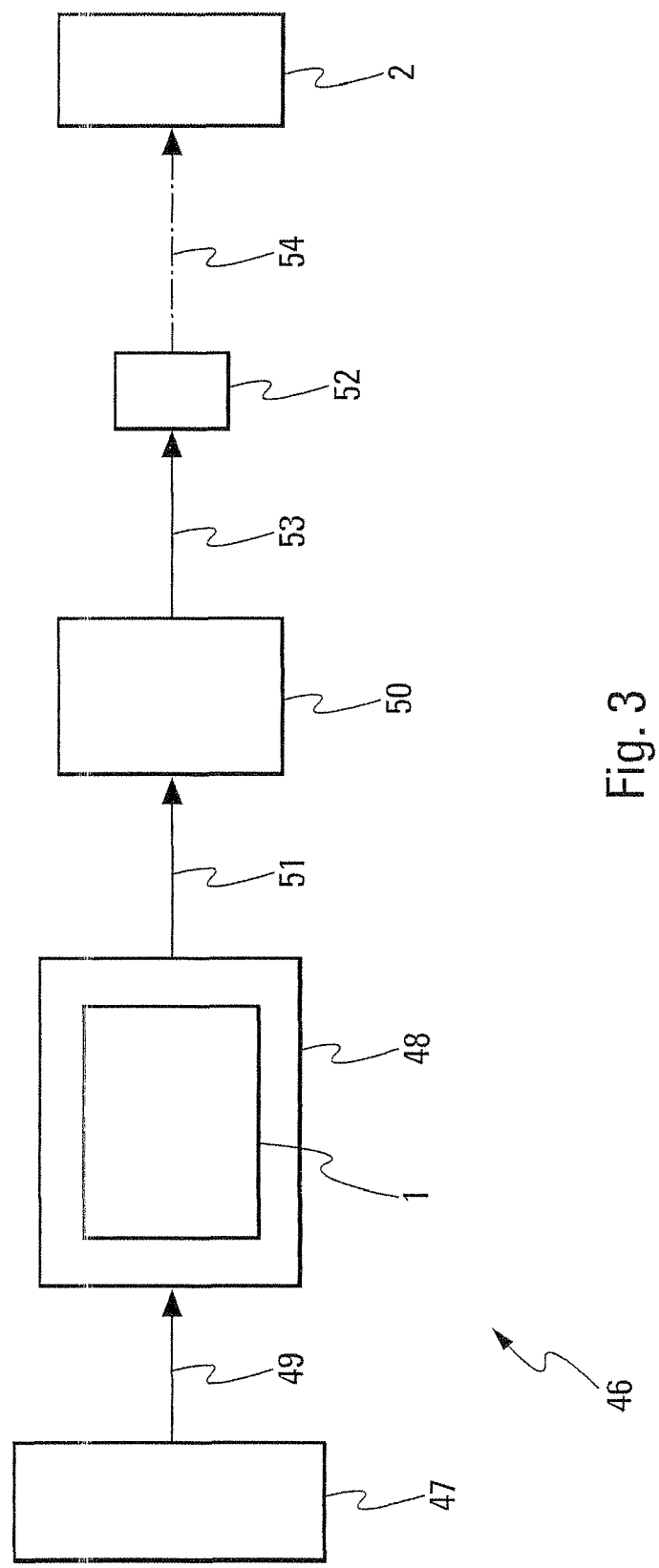
FIG. 3 is the schematic block diagram of an automatic control system of an aircraft control surface, according to this invention.

Such a system 46 comprises, as shown on FIG. 3:
- a set 47 of usual information sources, further comprising usual means being able to determine the parameter common values (velocity, altitude, of the aircraft, as well as a flight managing system;
- a computer, referred to as a master computer 48, being connected via a link 49 to said set 47 and comprising said device 1 according to this invention for generating a control order;
- at least one computer 50, referred to as a slave computer, receiving the control order generated by said device 1, via a link 51, and implementing a slaving of the control surface 2. Such a computer 50 comprises slaving means implementing a usual slaving loop. Said computer 50 carries out a velocity control; and
- at least one usual actuating means 52 of the control surface 2, for example, a side control surface, an elevator or a rudder.

Said actuating means 52 receives orders from said computer 50 by means of a link 53 and it correspondingly actuates said control station 2, as illustrated by a link 54 with mixed lines.

The invention claimed is:

1. A device for automatically generating a control order of at least one control surface of an aircraft, said device comprising:
   - at least one sensor for generating at least one control order;
   - a bus for issuing such a control order to a user;
   - a monitoring unit for monitoring the control order generated by said at least one sensor, so as to check whether it has a correct value or a wrong value, a wrong value representing a suspected deficiency, and should such a suspected deficiency be detected, in order to check whether said control order has a wrong value during a predetermined confirmation time, so as to confirm the deficiency; and
   - an inhibitor or inhibiting the control order issue when a deficiency is confirmed,
   characterized in that it further comprises:
   - a determining unit for determining, as soon as a suspected deficiency is detected, an auxiliary control order, summing the latest generated control order before such a detection and a predetermined order value illustrating a tolerated error margin; and
   - a transmitter for automatically transmitting to said bus, with a view to its issue as a control order:
   said control order generated by said at least one sensor, in the absence of a deficiency and a suspected deficiency; and
   said auxiliary control order determined by said determining unit, as soon as a suspected deficiency is detected, and this, until the end of said confirmation time, from which:
   if the deficiency is confirmed, the issue of the control order is inhibited;
   otherwise, said control order generated by said at least one sensor is issued again.

2. A device according to claim 1, characterized in that it comprises two computing units, each of which generates a control order, one of said computing units comprising said at least one sensor, and said monitoring unit intended to monitor the control order generated by the at least one sensor, are formed so as to simultaneously use the control orders generated by such two computing units.

3. A device according to claim 1, characterized in that said monitoring unit comprise at least one monitoring unit being integrated into one of said computing units and comprising:
   - a computing element calculating the difference between the control orders generated by said two computing units;
   - a comparison element comparing the difference calculated by said computing element to a predetermined value representing said tolerated error margin, a suspected deficiency being detected as soon as said difference is higher than said predetermined value; and
   - a confirmation element for checking, as soon as such a suspected deficiency is detected, whether said difference remains higher than said predetermined value during said confirmation time, in order to confirm the deficiency.

4. A device according to claim 3, characterized in that it comprises two monitoring units, one of which is integrated into one of said computing units and the other one is integrated into the other computing unit.

5. A device according to claim 1, characterized in that said determining unit and the transmitter are part of a computing assembly comprising:
   - a first element for determining an intermediary order, from control orders generated by two computing units;
   - a second element for adding said tolerated error margin to said intermediary order;
   - a third element for subtracting said tolerated error margin from said intermediary order; and
   - a voter receiving the values determined by said first, second and third elements, selecting the median value of the thus received values, and transmitting the selected median value to said bus so as to issue it as a control order.

6. A device according to claim 5, characterized in that said first element is formed so as to determine as an intermediary value:
   in the absence of detection of a suspected deficiency and in the absence of a deficiency, the most delayed control order of both control orders generated by said two computing units; and
   should a suspected deficiency be detected, the last generated control order before such a detection.

7. A device according to claim 1, characterized in that it further comprises an auxiliary monitoring unit being integrated into one of said computing units and comprising:
   - a computing element calculating the difference between control orders respectively issued by said two computing units;
   - a comparison element comparing the difference calculated by said computing element to a predetermined auxiliary value; and
   - a confirmation element for checking, as soon as said difference is higher than said predetermined auxiliary value, whether it remains so for an auxiliary confirmation time.

8. A system for automatically controlling at least one aircraft control surface, characterized in that it comprises:
- at least one actuator of said control surface being able to automatically move the latter;
- one device such as that specified in any of claims 1 to 7, for automatically generating a control order, and for automatically issuing such a control order to slaving unit; and
- said slaving unit automatically applying such a control order to said actuator of the control surface.

9. A method for automatically generating a control order of at least one aircraft control surface, wherein: A/ at least one control order is generated; and B/ such a control order is issued to a user, wherein, in addition, the following operations are performed:
- said control order generated in step A/ is monitored, in order to check whether it has a correct value or a wrong value, a wrong value representing a suspected deficiency, and if such a suspected deficiency is detected, in order to check whether said control order has a wrong value during a predetermined confirmation time, in order to confirm the deficiency; and
- when a deficiency is confirmed, issuing said control order of step B/ is inhibited, characterized in that furthermore, the following operations are performed:
- as soon as a suspected deficiency is detected, an auxiliary control order is determined, summing the last generated control order before such a detection and a predetermined order value illustrating a tolerated error margin; and
- in step B/, there is issued to the user, as a control order:
- said control order generated in step A/, in the absence of a deficiency and a suspected deficiency; and
- said auxiliary control order as soon as a suspected deficiency is detected, and this, until the end of said confirmation time, from which:
- if the deficiency is confirmed, the issue of the control order is inhibited;
- otherwise, said control order generated in step A/ is issued again.

10. A method for automatically controlling at least one aircraft control surface, characterized in that:
- a control order is automatically generated, implementing a method according to claim 9;
- such a control order is automatically issued to a slaving unit; and
- such a control order is automatically applied to at least one actuator of said control surface, by means of said slaving unit.

11. A device for automatically generating a control order of at least one control surface of an aircraft, said device comprising:
- at least one sensor for generating at least one control order;
- a bus for issuing such a control order to a user;
- a monitoring unit for monitoring the control order generated by said at least one sensor, so as to check whether it has a correct value or a wrong value, a wrong value representing a suspected deficiency, and should such a suspected deficiency be detected, in order to check whether said control order has a wrong value during a predetermined confirmation time, so as to confirm the deficiency; and
- an inhibitor for inhibiting the control order issue when a deficiency is confirmed, characterized in that it further comprises:
- a determining unit for determining, as soon as a suspected deficiency is detected, an auxiliary control order, summing the latest generated control order before such a detection and a predetermined order value illustrating a tolerated error margin; and
- a transmitter for automatically transmitting to said bus, with a view to it issue as a control order:
- said control order generated by said at least one sensor, in the absence of a deficiency and a suspected deficiency;
- said auxiliary control order determined by said determining unit, as soon as a suspected deficiency is detected, and this, until the end of said confirmation time, from which:
- if the deficiency is confirmed, the issue of the control order is inhibited;
- otherwise, said control order generated by said at least one sensor is issued again; and
- two computing units, each of which generates a control order, one of said computing units comprising said at least one sensor, and said monitoring unit intended to monitor the control order generated by the at least one sensor, are formed so as to simultaneously use the control orders generated by such two computing units.

* * * * *